(12) United States Patent
Leibinger et al.

(10) Patent No.: US 7,045,740 B2
(45) Date of Patent: May 16, 2006

(54) LASER PROCESSING INSTALLATION WITH INTEGRATED LOADING/UNLOADING OF WORKPIECES

(75) Inventors: Peter Leibinger, Gerlingen (DE); Leonid Zeygerman, West Hartford, CT (US)

(73) Assignee: Trumpf, Inc., Farmington, CT (US)

( * ) Notice: Subject to any disclaimer, the term of this patent is extended or adjusted under 35 U.S.C. 154(b) by 237 days.

(21) Appl. No.: 10/676,552

(22) Filed: Oct. 1, 2003

(65) Prior Publication Data

US 2005/0072767 A1    Apr. 7, 2005

(51) Int. Cl.
*B23K 26/02* (2006.01)

(52) U.S. Cl. .......................... 219/121.82; 219/121.67; 219/121.78

(58) Field of Classification Search ........... 219/121.82, 219/121.67, 121.78, 121.66, 121.85
See application file for complete search history.

(56) References Cited

U.S. PATENT DOCUMENTS

| | | | |
|---|---|---|---|
| 3,226,527 A | 12/1965 | Harding | |
| 3,855,445 A | 12/1974 | Jungle | |
| 4,316,073 A | 2/1982 | Lemelson | |
| 4,656,713 A | 4/1987 | Rosa et al. | |
| 4,659,902 A | 4/1987 | Swensrud et al. | |
| 4,677,734 A | 7/1987 | Bloch et al. | |
| 4,698,480 A | 10/1987 | Klingel | |
| 4,851,637 A * | 7/1989 | Puozzo et al. | 219/121.78 |
| 4,931,615 A | 6/1990 | Muncy et al. | |
| 5,036,736 A | 8/1991 | Hillock et al. | |
| 5,109,148 A * | 4/1992 | Fujita et al. | 219/121.82 |
| 5,132,510 A * | 7/1992 | Klingel et al. | 219/121.82 |
| 5,192,848 A | 3/1993 | Miyakawa et al. | |
| 5,304,773 A * | 4/1994 | Kilian et al. | 219/121.78 |
| 5,310,991 A | 5/1994 | Franco | |
| 5,359,175 A | 10/1994 | Miyagawa et al. | |
| 5,439,431 A | 8/1995 | Hessbrüggen et al. | |
| 5,468,101 A | 11/1995 | Shoda | |
| 5,481,083 A * | 1/1996 | Smyth, Jr. | 219/121.67 |
| 5,637,243 A * | 6/1997 | Sato et al. | 219/121.67 |
| 5,744,778 A | 4/1998 | Kash et al. | |
| 5,854,460 A * | 12/1998 | Graf et al. | 219/121.67 |
| 5,885,199 A | 3/1999 | Shao | |
| 5,901,938 A | 5/1999 | Mosca et al. | |
| 5,989,374 A | 11/1999 | Bull et al. | |

(Continued)

FOREIGN PATENT DOCUMENTS

JP          8 057738 A       3/1996

*Primary Examiner*—M. Alexandra Elve

(57) ABSTRACT

A machine tool installation for laser cutting of sheet workpieces has a workpiece support, an elongated machine frame providing an arm extending over the workpiece support, and a track on the arm which extends longitudinally of the frame. A motion unit is suspended from the track and mounted for movement therealong, and there is drive assembly for moving the motion unit bidirectionally along the track. A laser cutting unit is mounted on the motion unit and includes a laser cutting head movable thereon along an axis perpendicular to the track on the machine frame. A loading unit is provided at a loading station adjacent one end of said machine frame for lifting and transporting a sheet workpiece above the plane of the upper surface of the workpiece support and the loading assembly is moveable on the track on the frame. An unloading unit is provided at a parts receiving station adjacent the other end of the machine frame for lifting the cut workpieces and skeleton from the workpiece support, and it is moveable on the track to transport the cut workpieces to the parts receiving station. The motion unit is releasably coupled to the loading and unloading units for movement therewith along the track on the machine frame.

16 Claims, 16 Drawing Sheets

U.S. PATENT DOCUMENTS

| | | |
|---|---|---|
| 6,013,895 A | 1/2000 | Steadman |
| 6,046,428 A * | 4/2000 | Serruys ................ 219/121.67 |
| 6,163,010 A | 12/2000 | Kobsa |
| 6,213,704 B1 | 4/2001 | White et al. |
| 6,233,538 B1 | 5/2001 | Gupta et al. |
| 6,243,611 B1 | 6/2001 | Hazama et al. |
| 6,277,319 B1 | 8/2001 | Hardgrove et al. |
| 6,433,342 B1 | 8/2002 | Cordts, III et al. |
| 6,445,971 B1 | 9/2002 | Gottschalk et al. |
| 6,452,195 B1 | 9/2002 | Smick et al. |
| 6,472,253 B1 | 10/2002 | Bothra |
| 6,586,706 B1 | 7/2003 | Erlenmaier et al. |
| 6,606,531 B1 * | 8/2003 | Leibinger et al. ........... 700/114 |

* cited by examiner

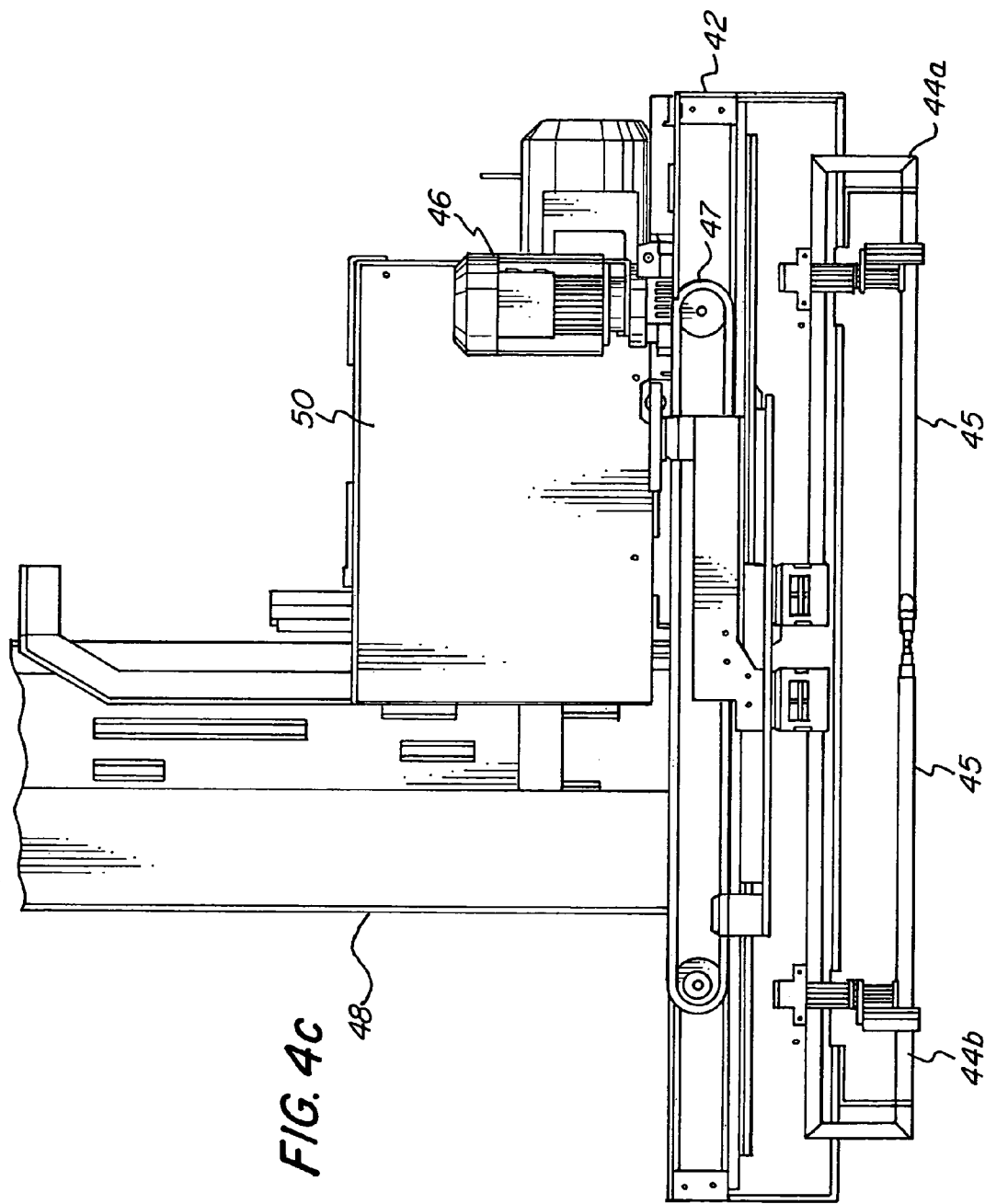

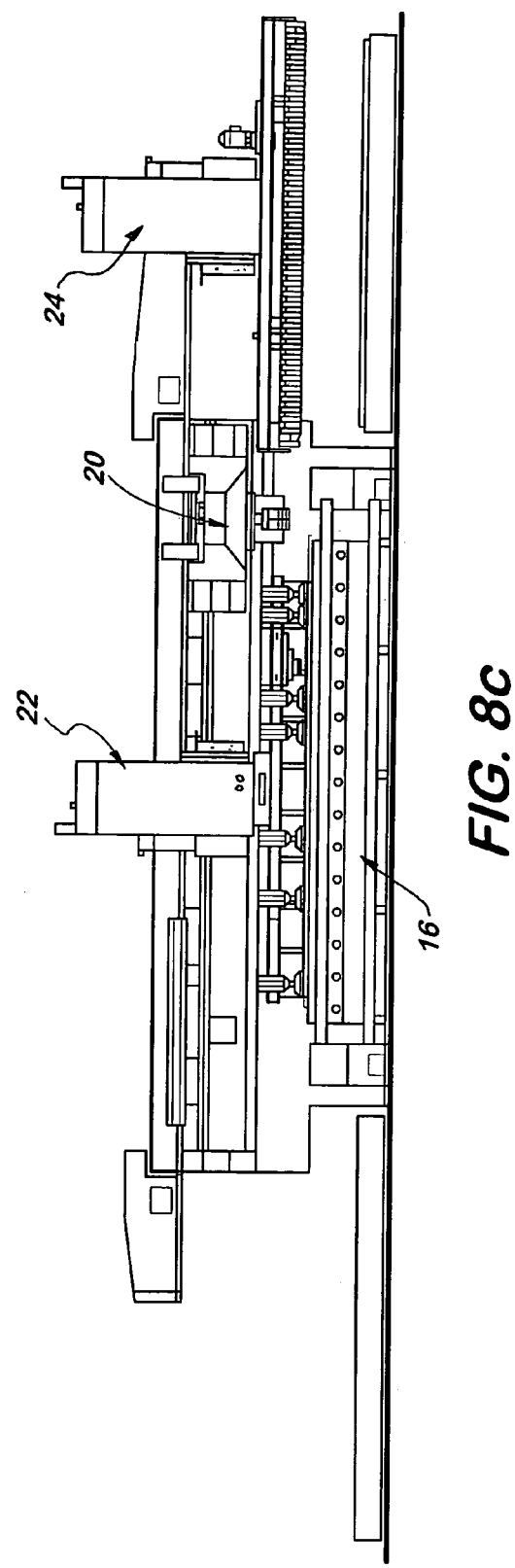

LASER PROCESSING INSTALLATION WITH INTEGRATED LOADING/UNLOADING OF WORKPIECES

BACKGROUND OF THE INVENTION

The present invention relates to laser cutting installations in which the sheet is loaded automatically.

Laser cutting machines are now widely employed for processing of sheet metal workpieces since the laser will cut the sheet metal rapidly and the laser beam and/or the workpiece can be moved by a guidance system to enable precise cutting of parts. One type of common laser cutting machine for processing large sheet metal workpieces has a work support over which there is a movable bridge, and the laser cutting head is supported on the bridge. The bridge can be moved along the workpiece support to effect cutting of the workpiece in the longitudinal direction, and the laser cutting head can be moved along the bridge to effect cutting in the transverse direction. Illustrative of such machines is Erlenmaier U.S. Pat. No. 6,586,706 and Kilian U.S. Pat. No. 5,304,773.

Loading units for the sheet metal workpieces have been widely employed for punch presses and laser cutting machines and generally involve suction devices which are arranged in a grid that can be adapted to the size of the sheet metal workpiece to be picked up and carried by the loading unit. Generally, such loading units will pick up the sheet metal and then rotate or otherwise move to deposit the sheet on the workpiece support in the desired position. Exemplary of such loading units is that illustrated and described in Leibinger et al U.S. Pat. No. 6,066,531.

The cutting operation will frequently produce numerous small parts and a skeleton which must be removed from the workpiece support. Although the operator may remove and sort them manually, this extends the processing time and reduces the productivity of the laser cutting machine. Accordingly, various types of units have also been provided for removing from the workpiece support the cut parts and skeleton. It has also been proposed to leave small webs of material retaining the cut parts in the skeleton so that the cut workpiece can be lifted as a unit by a suction arrangement; the remaining webs are then broken to release the parts from the skeleton after it has been transported to a separation station.

It will be appreciated that these types of installations involve separate units with their own drive mechanisms. A numeric control system must not only control the cutting motion but also the motion of the loading unit and the unloading unit as the case may be. At times this presents problems from the standpoint of effecting the desired alignment of the workpiece in the workstation or rapid changes between different cutting programs.

It is an object of the present invention to provide a novel laser cutting installation in which cutting, loading and unloading units are provided in one single integrated machine.

It is also an object to provide such a laser cutting installation which can be fabricated relatively readily and which is simple to operate.

SUMMARY OF THE INVENTION

It has now been found that the foregoing and related objects may be readily attained in a machine tool installation for laser cutting of sheet workpieces comprising a workpiece support and an elongated machine frame providing an arm extending over the workpiece support. A track on the arm extends longitudinally of the frame, and a motion unit is suspended from the track and mounted for movement therealong. Drive means is provided for moving the motion unit bidirectionally along the track. A laser cutting unit is mounted on the motion unit and includes a laser cutting head movable thereon in an axis perpendicular to the track on the machine frame arm.

A loading unit is provided at a loading station adjacent one end of the machine frame for lifting a sheet workpiece above the plane of the upper surface of the workpiece support, and moving it along the track. An unloading unit is provided at a parts receiving station adjacent the other end of the machine frame for lifting the cut parts and skeleton from the workpiece support, and it is moveable on the track for transporting the skeleton and parts to the parts receiving station. Means is provided on the motion unit for releasably coupling the loading unit and unloading unit thereto for movement therewith along the track on the machine frame.

A controller is operable to (i) couple the loading and unloading units to the motion unit, (ii) control movement of the motion unit along the track, (iii) deposit a workpiece on the workpiece support, (iv) effect motion of the laser cutting head relative to a workpiece on the workpiece support to produce cut parts, (v) actuate the unloading unit to remove the cut parts from the workpiece support, and (vi) transport the parts on the unloading unit to the parts receiving station.

Preferably, a pair of parallel tracks is provided on the arm of the machine frame. The motion unit drive means comprises a rack on the arm of the machine frame, a pinion unit on the motion unit engaged with the rack, and a bidirectional motor for driving the pinion. Frame extensions are provided on both ends of the machine frame, and extend over the loading station and parts receiving station. The frame extensions have tracks thereon aligned with, and functioning as a continuation of, the tracks on the arm of the machine frame. Preferably, a coupling device is provided on each of the loading and unloading units and these extend longitudinally of the frame. Releasable coupling means is provided at the ends of the coupling devices and engageable with cooperating coupling means on the motion unit.

The motion unit has a track on its lower surface extending perpendicularly to the track on the machine frame arm, and the laser cutting unit is movably mounted on the motion unit track. The laser cutting unit is movable on the motion unit track by a rack and pinion drive assembly and a reversible drive motor. The motion unit also supports a bellows providing an enclosed beam passage chamber which extends along the motion unit to the laser cutting unit.

The laser cutting of the workpiece in the longitudinal direction of the frame (X-axis) is effected by movement of the motion unit on the frame and cutting in the direction perpendicular thereto (Y-axis) is effected by movement of the laser cutting unit along the track on the motion unit. Desirably, the laser cutting unit also includes a drive for moving the laser cutting head in the vertical direction.

The loading unit includes a multiplicity of suction devices actuatable to pick up and support a sheet workpiece as it is transported to the workpiece support.

BRIEF DESCRIPTION OF THE ATTACHED DRAWINGS

FIG. 4c is an enlarged cross sectional view of the operative portion of the unloading unit illustrating the drive mechanism for moving the fork assemblies;

Figure 8A:
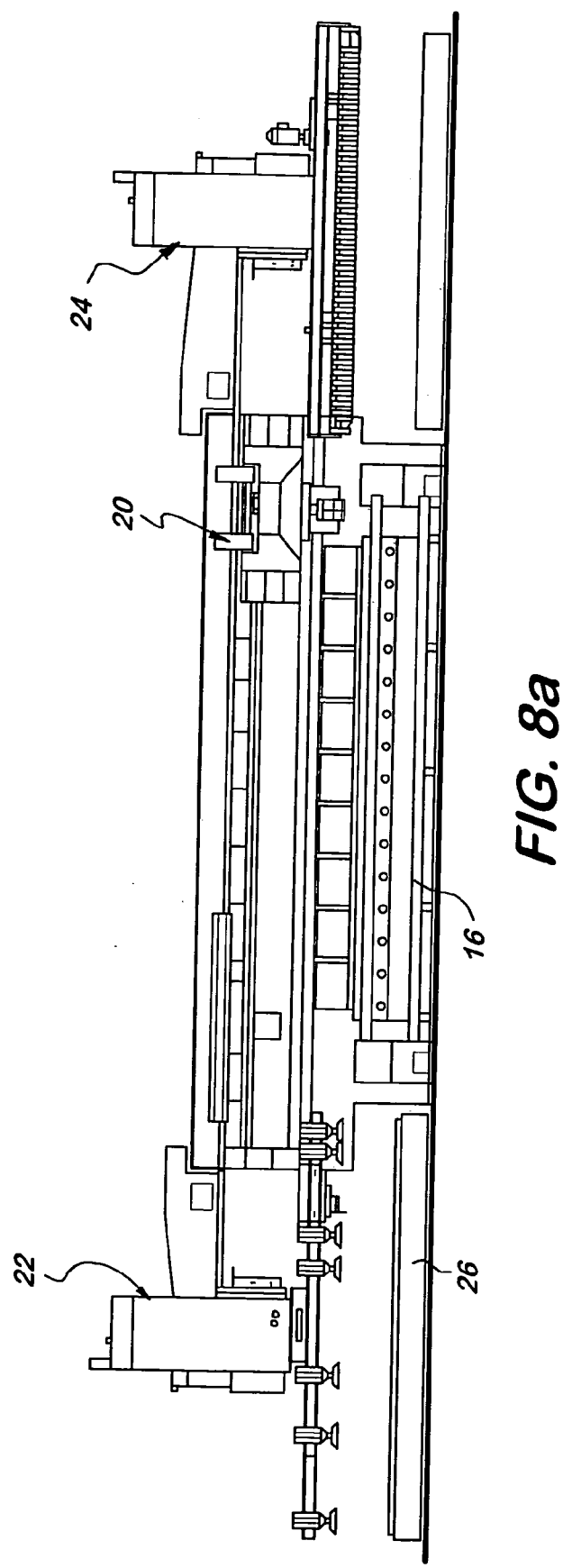
FIG. 8a is a view of the principal operating components of the laser cutting machine in the position for coupling the unloading unit to the motion unit and with the loading unit uncoupled.
Figure 8B:
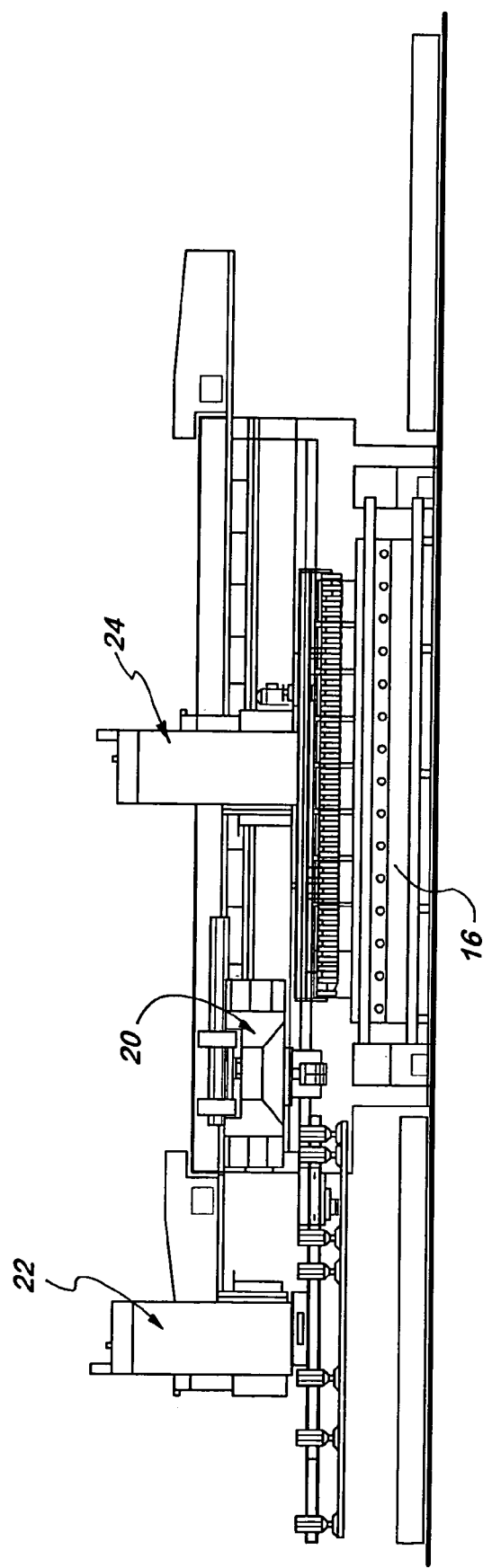
FIG. 8b is a similar view with the units shown in the position for unloading of the skeleton and cut parts from the workpiece support table and for coupling the loading unit to the motion unit.
Figure 8D:
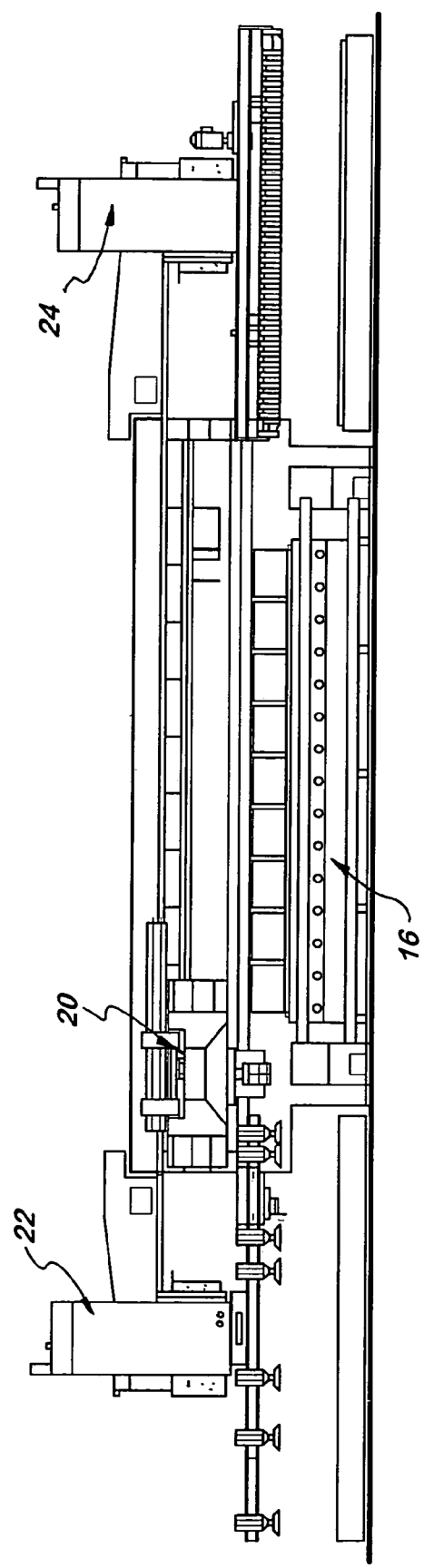
FIG. 8d is a similar view showing the components after the loading unit has been returned to its home position.
Figure 8E:
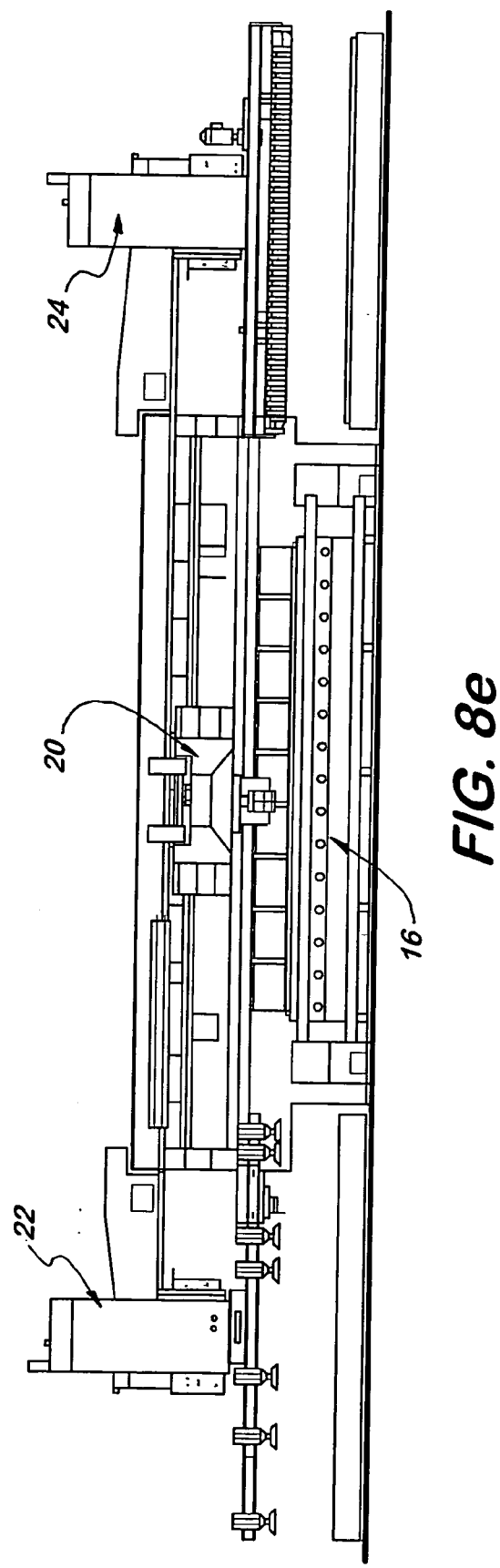
FIG. 8c is a similar view showing the loading unit after it has placed a fresh workpiece on the surface of the workpiece support table and the unloading unit has discharged the parts and skeleton.
Figure 9A:
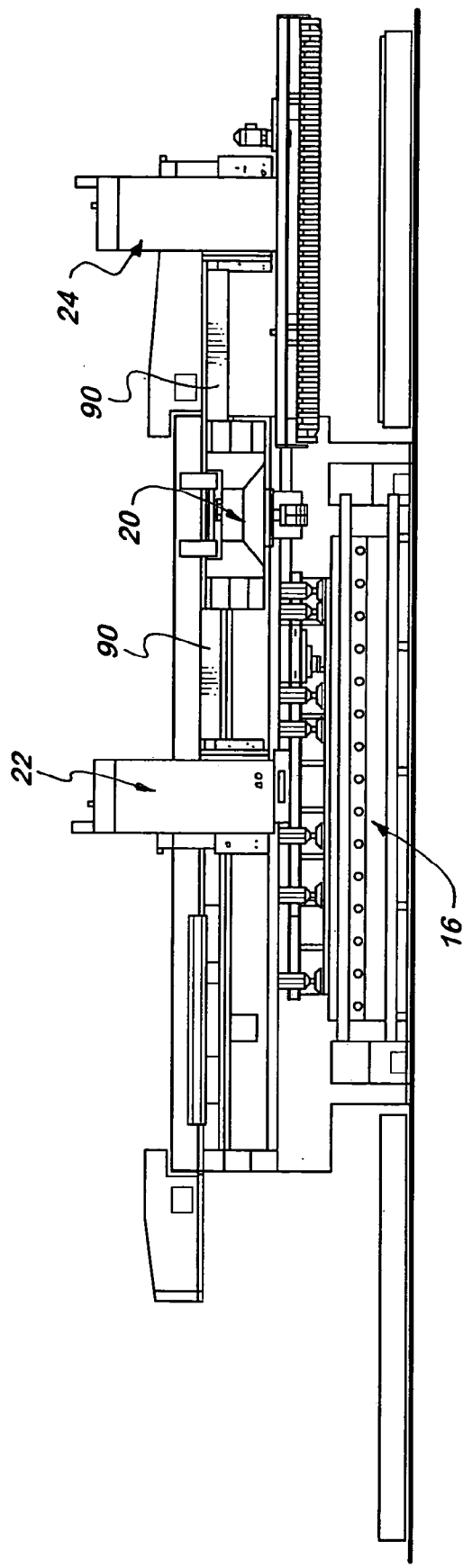
Figure 9B:
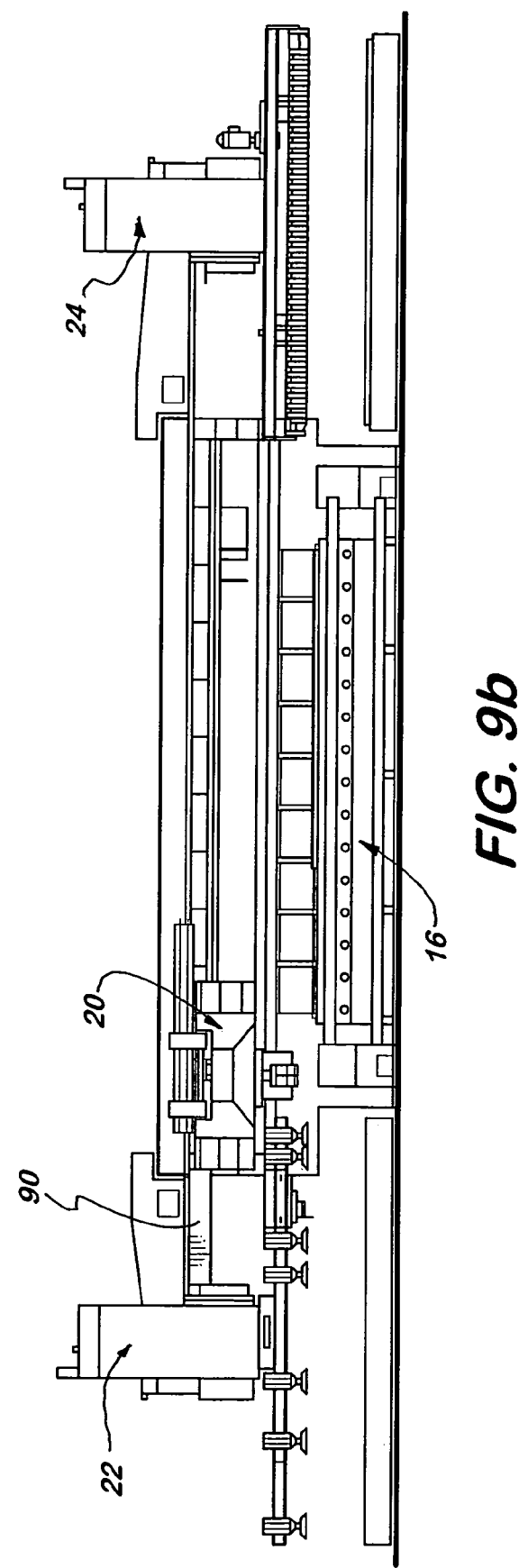

FIG. 8e is a similar view of the motion unit in position for laser cutting and with the loading and unloading units latched in their home positions; and FIG. 9a is a front elevational view of the laser cutting machine diagrammatically showing the coupling devices on both the loading and unloading units coupled to the motion unit; and FIG. 9b shows only the loading unit coupling device coupled to the motion unit.

BRIEF DESCRIPTION OF THE ILLUSTRATED EMBODIMENTS

Figure 1:
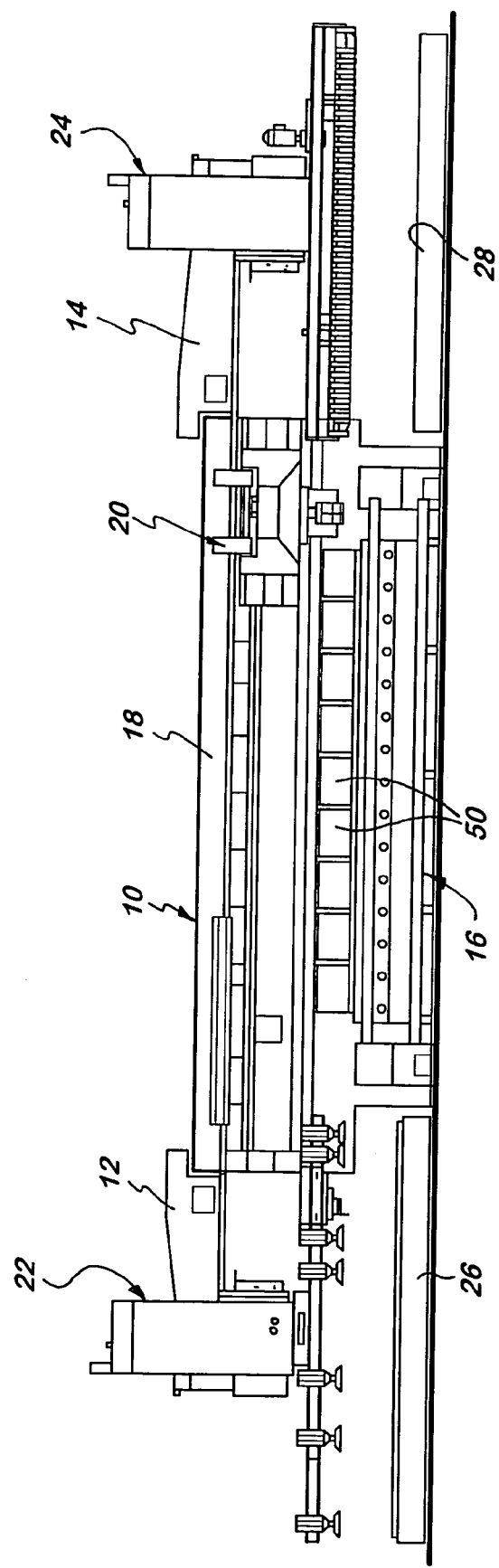
FIG. 1 is a front elevational view of a laser cutting machine embodying the present invention and with both the loading and unloading units being shown in their home positions.

Turning first to FIG. 1, a laser cutting machine embodying the present invention has an elongated C-shaped frame generally designated by the numeral 10 with cantilevered extensions 12, 14 at each end thereof. Centrally of the frame 10 is a workpiece support table generally designated by the numeral 16. Movably supported on the upper arm 18 of the machine frame 10 is a motion unit generally designated by the numeral 20.

Shown in its home position supported on the extension 12 is a loading unit generally designated by the numeral 22, and supported on the extension 14 is an unloading unit generally designated by the numeral 24. Below the loading unit 22 is a stack 26 of sheet metal workpieces and below the unloading unit 24 is a platform upon which cut parts and sheet metal skeletons 28 are deposited by the unloading unit 22.

The motion unit 20, loading unit 22 and unloading unit 24 are all reciprocatably supported on tracks 30 on the lower surfaces of the upper arm 32 of the machine frame 10 and of the extensions 12, 14.

Figure 2:
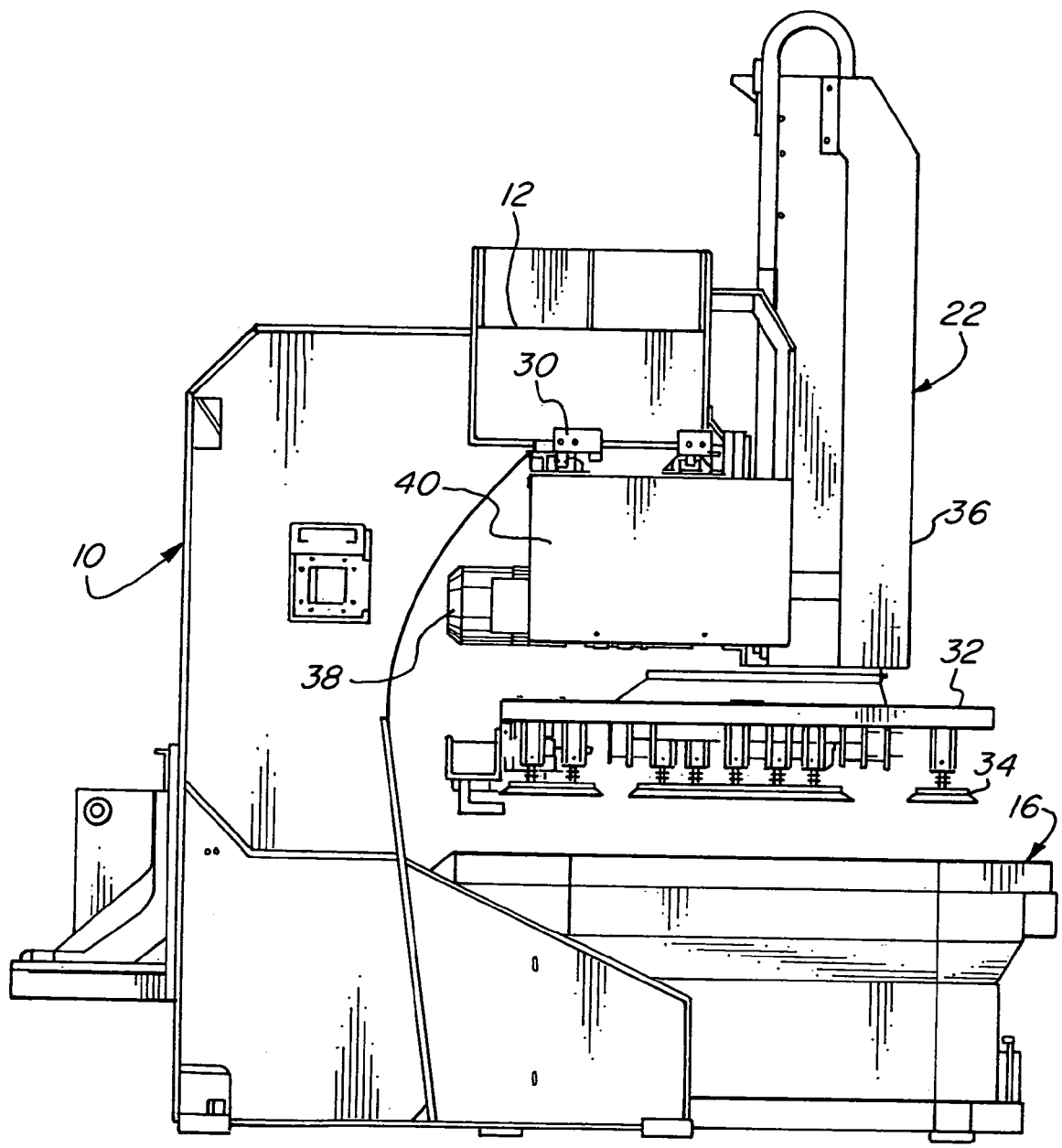
FIG. 2 is an end elevational view of the loading unit end of the machine of FIG. 1 and drawn to an enlarged scale.

Turning first in detail to the loading unit 22 as seen in FIG. 2, it has a carrier frame 32 which supports a large number of suction cups 34 in a grid pattern and these are individually connected to a suction or vacuum source (not shown). The carrier frame 32 is supported on the housing 36 which can be moved upwardly and downwardly by a computer controlled motor 38 supported in the housing 40 and a chain mechanism (not shown). As is conventional, the housing 36 contains computer controlled valves which enable selective activation of only those suction cups necessary to pick up, lift and carry a workpiece 26 from the stack thereunder. The housing 40 is supported on the tracks 30.

Figure 3:
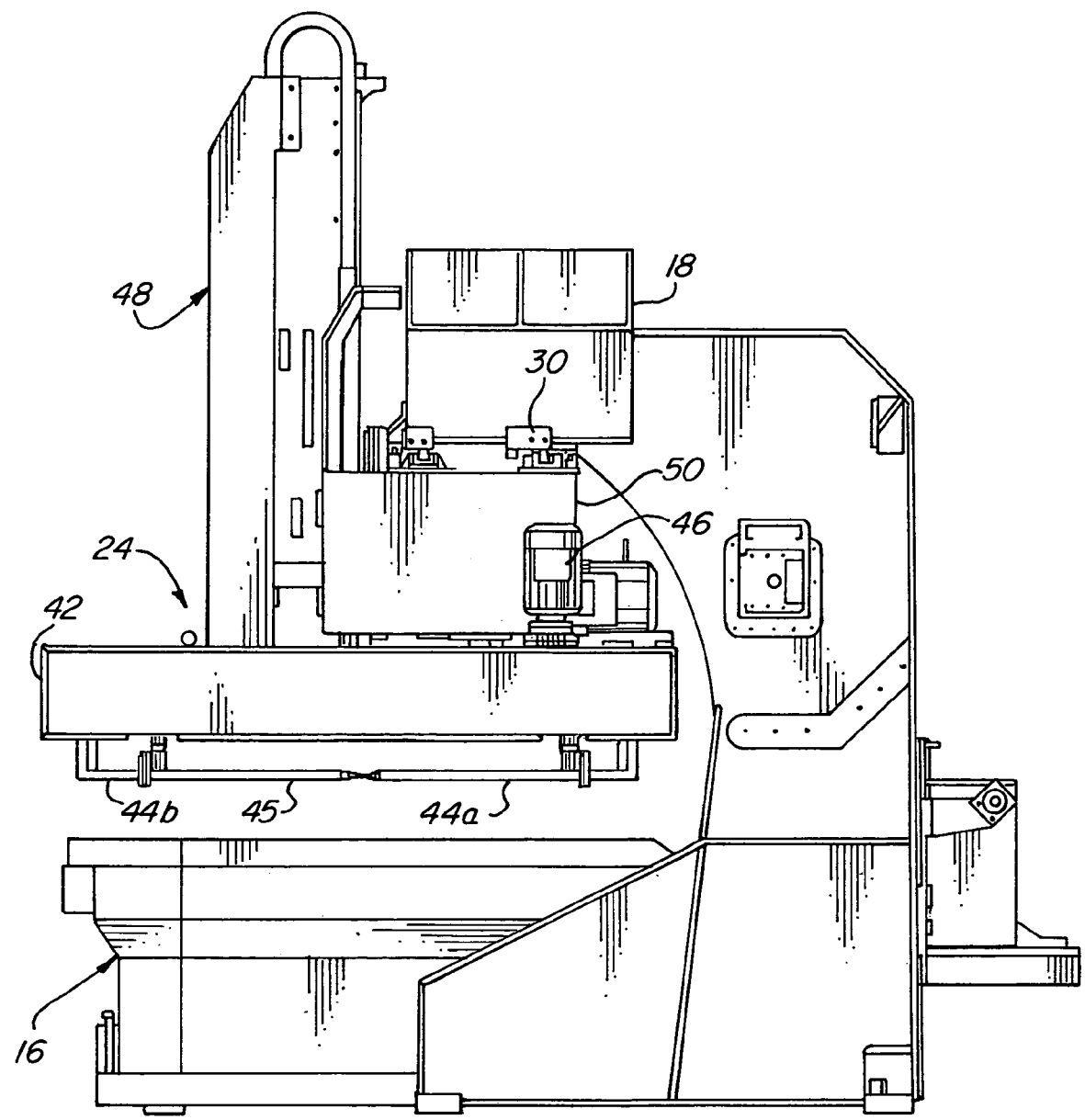
FIG. 3 is an end elevational view of the unloading unit end of the laser cutting machine and drawn to an enlarged scale.
Figure 4A:
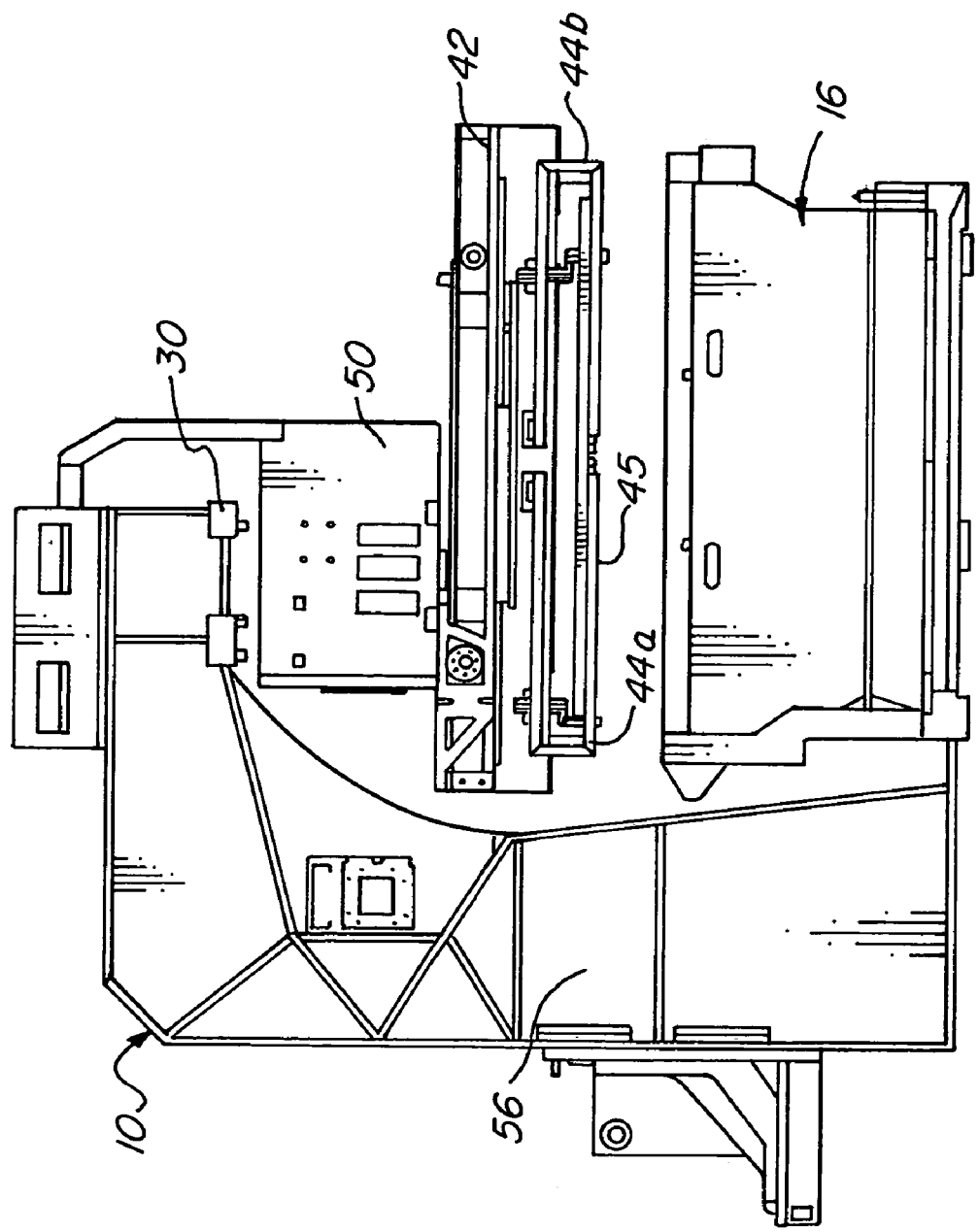
FIG. 4a is a view of the unloading unit with the forks opened to allow the unloading unit to move downwardly to pick up the cut parts and skeleton from the top surface of the workpiece support table.
Figure 4B:
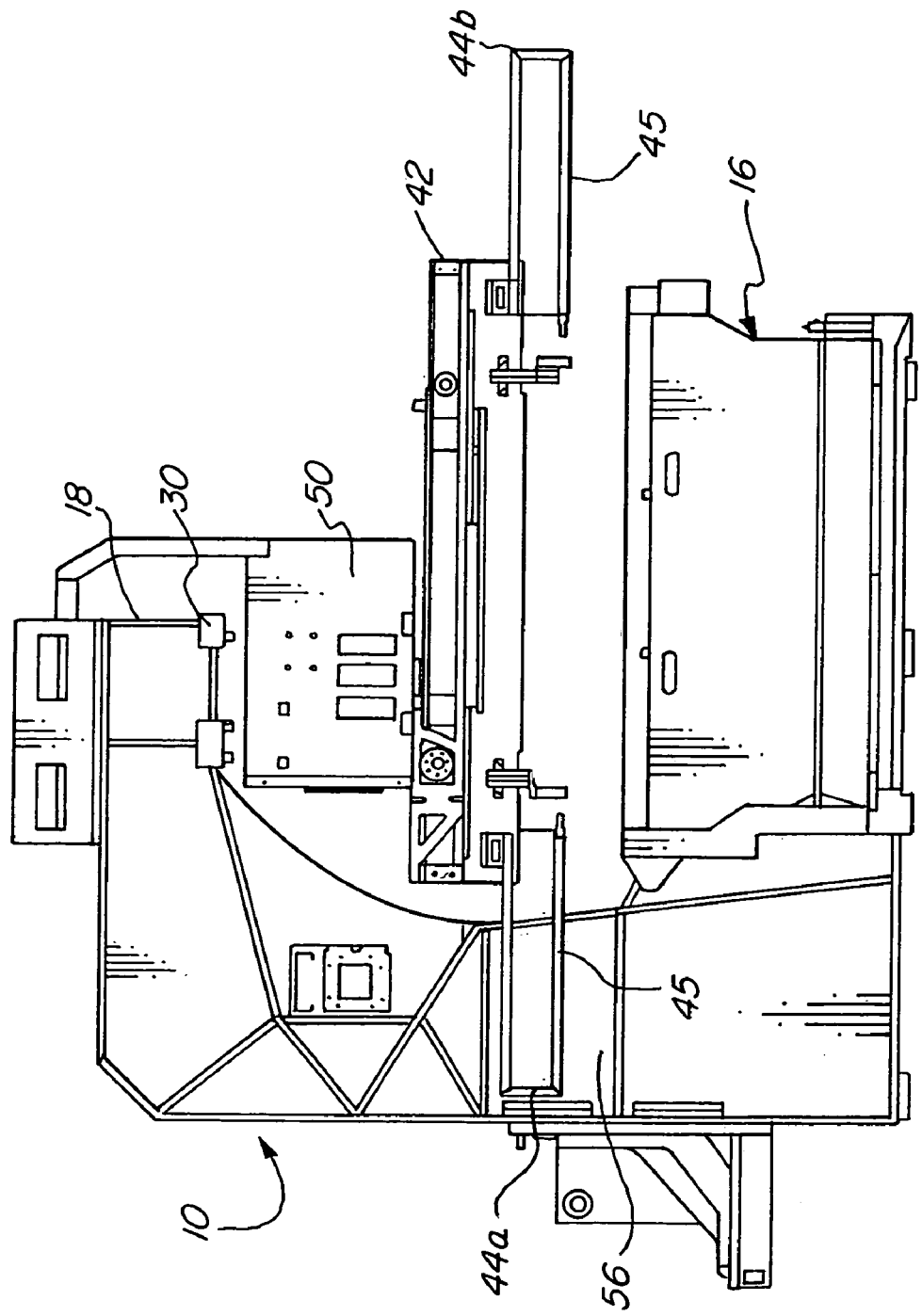
FIG. 4b is a cross sectional view of the laser cutting machine showing the unloading unit after it has picked up the parts and skeleton from the workpiece support table.

Turning next to the unloading unit 24 as seen in FIGS. 3, 4a and 4b, a frame 42 which reciprocatably supports opposed fork assemblies 44 comprised of a multiplicity of individual, parallel forks 45 of generally C-shaped configuration. These fork assemblies 44a, 44b are reciprocated between an open position shown in FIG. 4a and a closed pickup position shown in FIGS. 4b. This motion is effected by a drive motor 46 on the frame 42 and a drive chain 47 connected to the fork assemblies 44a, 44b. The frame 42 is supported on the housing 48 which is movable vertically on the housing 50 which is movable longitudinally of the machine frame 10 on the tracks 30.

For movement on the machine frame 10 from its home position seen in FIG. 1 to its pickup location, the fork assemblies 44a, 44b are in the position shown in FIG. 4b. After the unloading unit 24 has been moved to the pick up location over the workpiece support table 16, the fork assemblies 44a, 44b are moved into their open position shown in FIG. 4a. This enables the frame 42 and fork assemblies 44a, 44b to move downwardly into the pickup position. To enable the closed ends of the fork assemblies 44a, 44b and the forks 45 to be moved outwardly of the support grid 52 of the workpiece support table 16, the vertical wall 54 of the machine frame 10 has a series of horizontally spaced recesses 56 into which the closed end of the fork assembly 44a is moved. The closed end of the folk assembly 44b is also moved outwardly of the support grid 52. This allows the inner ends of the forks 45 to clear the grid 52 of the workpiece support table 16. The frame 42 and fork assemblies 44a, 44b are moved downwardly until the forks 45 are disposed below the top surface of the support grid 52 on the workpiece support table 16. The motor 46 is then actuated to move the fork assemblies 44a, 44b to their closed position below the parts and skeletons 28 on the grid 52. The drive motor (not shown) for the vertical motion of the housing 48 and frame 42 is then actuated to lift the parts and skeleton 28 from the grid 52 and move the frame 42 to the elevated position seen in FIG. 4a so that the unloading unit 24 with the removed parts may be moved along the tracks 30.

Figure 5:
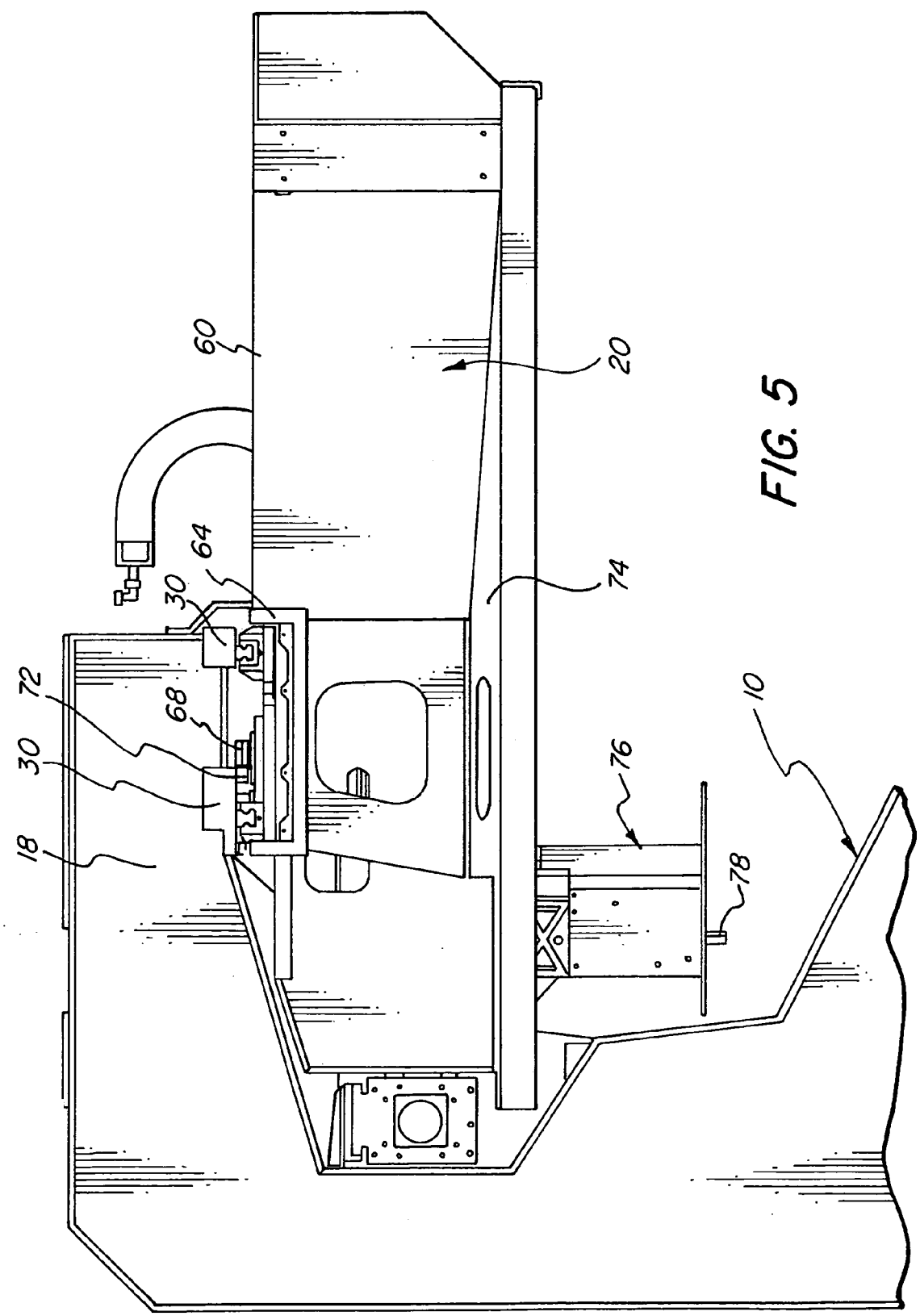
FIG. 5 is a side elevational view drawn to an enlarged scale of the motion unit in FIG. 1.
Figure 6:
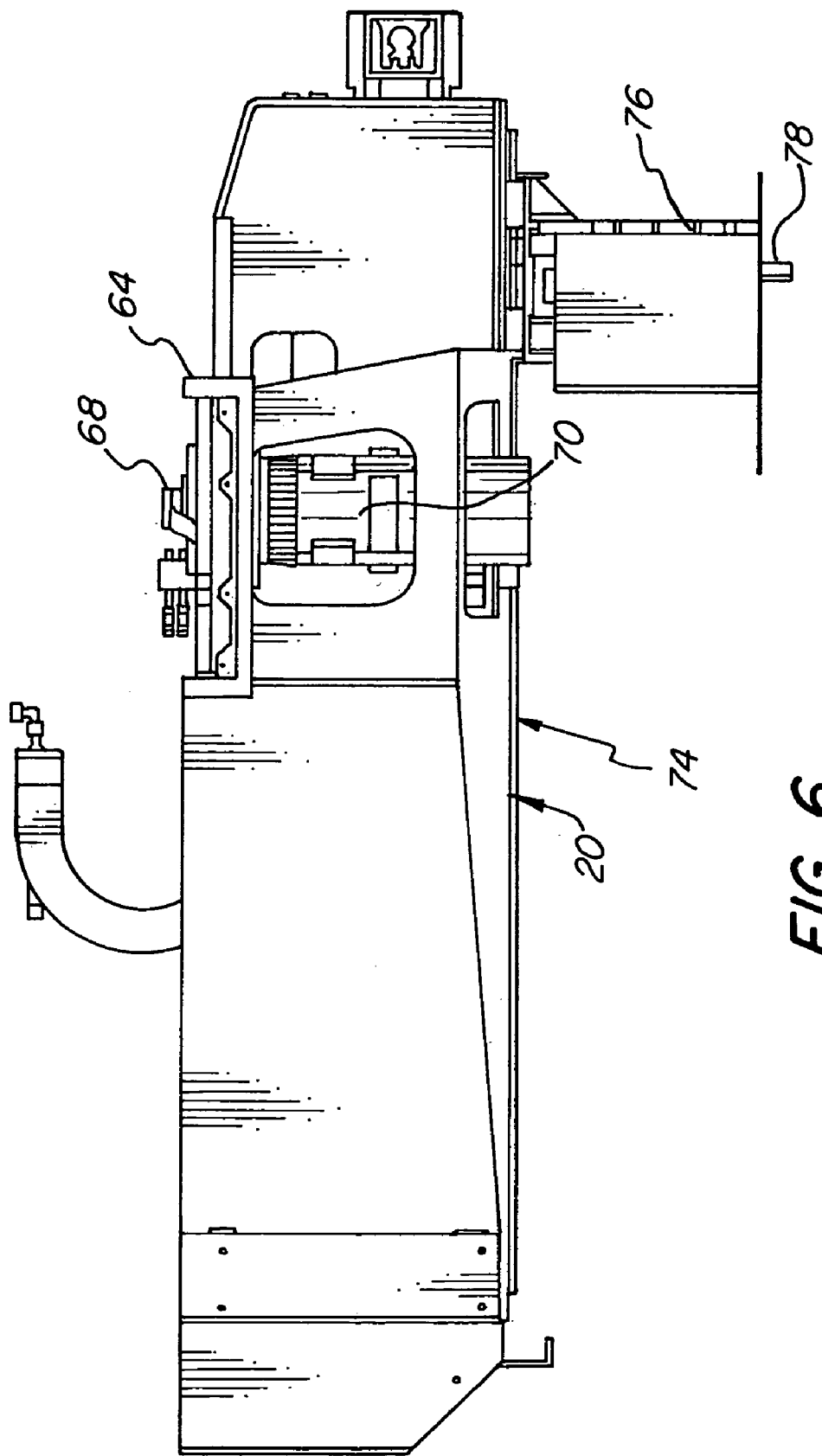
FIG. 6 is an elevational view of the other side of the motion unit of FIG. 1 as supported on the tracks on the machine frame.
Figure 7:
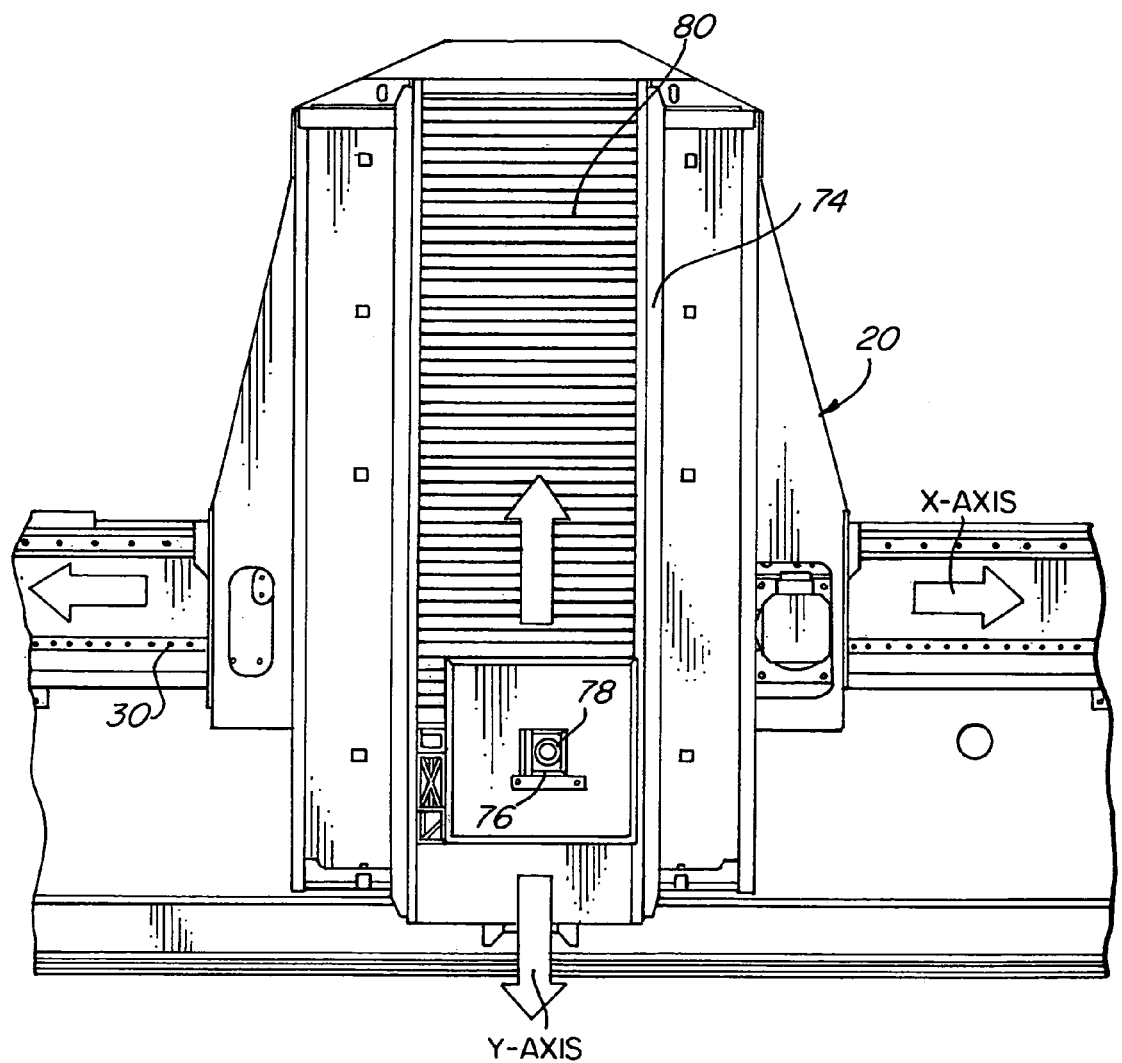
FIG. 7 is a bottom view of the motion unit showing the axes of movement of the cutting unit.

Turning next in detail to the motion unit 20 as seen in FIGS. 5–7, it has a housing generally designated by the numeral 60 and a machine track mounting plate 64 with carriages 66 which are supported on the tracks 30. A pinion 68 is driven by the bidirectional motor 70 and meshes with a rack 72 on the lower surface of the upper arm 18 of the machine frame 10 to effect movement of the motion unit along the tracks 30.

As seen in FIG. 7, the motion unit 20 with the laser cutting unit 76 moves along the tracks 30 to cut the workpiece in the X-axis and the laser cutting unit 76 moves on the tracks 74 of the motion unit 20 to cut in the Y-axis.

To correct the motion unit 20 to the loading and unloading units 22, 24, coupling devices 90 are provided on the loading and unloading units 22, 24. These are used not only to couple the motion unit 20 to the loading and unloading units 22, 24 but also to engage the machine frame 10 to retain the unit in its home position when uncoupled from the motion unit 20. The coupling device 90 will normally be engaged with the unloading unit and snap into engagement with the motion unit 20. When the units 22, 24 are latched in the home position, the motion of the motion unit 20 away from the unit 22, 24 will unlatch the control unit from the coupling device 90.

Movably mounted on tracks 74 is a laser cutting unit generally designated by the numeral 76 and containing the laser cutting head 78. The laser cutting unit 76 is coupled to a bellows 80 (seen in FIG. 7). Optics supported on the machine frame 10 direct the laser beam along the machine frame 10 and then into the Y-axis beam bellows (not shown) and through another set of optics into the moving cutting unit 76 and the laser cutting head 78.

In the laser cutting unit is a motor (not shown) which rotates a pinion gear (not shown) to move the unit 76 along Y-axis 74. Also disposed in the cutting unit 76 is a second drive motor (not shown) to move the cutting head 78 vertically (Z-axis).

Also fragmentarily illustrated are various cables and hoses for operation of the motors and suction devices.

FIGS. 8a–8e illustrate the working cycle of the laser cutting machine of FIG. 1. As seen in FIG. 8a, the motion unit 20 has moved to pick up the empty unloading unit 24 which is latched in its home position.

Turning next to FIG. 8b, the motion unit 20 has now moved the unloading unit 24 into its operative position over the workpiece support table 16. At this point, the fork assemblies 44a, 44b are moved to their open position and the frame 42 with the fork assemblies 44a, 44b is moved downwardly to a position below the upper surface of the grid 52. The fork assemblies 44a, 44b are moved to their closed position with the forks 45 being disposed between the grid elements 52. The frame 42 is then moved upwardly and the forks 45 lift the skeleton and the parts 28 from the surface of the workpiece support table 16 since they are now supported on the fork assemblies 44a, 44b. At this point in time, the motion unit 20 has been engaged by the coupling device 90 to the loading unit 22, and the loading unit 22 has picked up a sheet workpiece 26.

FIG. 8c shows that the motion unit 20 has moved to the right in the drawing and it has also moved both units 22, 24. As a result, the unloading unit 24 is disposed over the platform 28. Operating the fork assemblies 44a, 44b to move them into their open position causes the parts and skeleton 26 to drop onto the platform 28. The workpiece 26 supported by the loading unit 22 is now moved downwardly to place it on the upper surface of the workpiece support table 16 and the suction is then terminated to release the workpiece 26.

Turning next to FIG. 8d, the motion unit 20 has been unlatched from the coupling device 90 of the unloading unit 24, and it has moved the loading unit to its home position. The loading unit 22 has been latched into position and the coupling device 90 thereafter disengaged from the control unit 20.

As seen in FIG. 8e, the motion unit 20 is free from both units 22, 24 is now moved into its operative position over the workpiece 26 on the workpiece support table 16 and the guidance system now moves the motion unit 20 in the X-axis on the machine frame 10 and the laser cutting unit 76 in the Y-axis to effect the desired cutting operations upon the workpiece 26.

As can be seen from the attached drawings, the motion unit with the laser cutting unit is readily accessible from the front of the machine so as to facilitate changing of the optics and other servicing of the cutting head. The motion of the loading and unloading units is controlled by the motion of the motion unit, and the motion unit is easily coupled to and uncoupled from the other units by its motion relative thereto.

Thus, the laser cutting machine of the present invention may be readily fabricated, is easily operated with relative minimal programming, and is easily serviced.

Having thus described the invention, what is claimed is:

1. A machine tool installation for laser cutting of sheet workpieces comprising:
    (a) a workpiece support;
    (b) an elongated machine frame providing an arm extending over said workpiece support;
    (c) a track on said arm and extending longitudinally of said frame;
    (d) a motion unit suspended from said track and mounted for movement therealong;
    (e) drive means for moving said motion unit bidirectionally along said track;
    (f) a laser cutting unit mounted on said motion unit and including a laser cutting head movable thereon in an axis perpendicular to said track;
    (g) a loading unit at a loading station adjacent one end of said machine frame for lifting and transporting a sheet workpiece above the plane of the upper surface of said workpiece support; said loading assembly being moveable on said track;
    (h) an unloading unit at a parts receiving station adjacent the other end of said machine frame for lifting the cut workpieces from said workpiece support and moveable on said track and transporting them to the parts receiving station;
    (i) means on said motion unit for releasably coupling said loading unit and unloading unit thereto for movement therewith along said track on said machine frame; and
    (j) a controller operable to (i) couple and uncouple said loading and unloading units to and from said motion unit, (ii) control movement of said motion unit along said track, (iii) lift, transport and deposit a workpiece on said workpiece support, (iv) effect motion of said laser cutting head relative to a workpiece on said workpiece support to produce cut parts, (v) actuate said unloading unit to remove the cut parts from the workpiece support, and (vi) transport the parts on said unloading unit to the parts receiving station.

2. The machine tool installation in accordance with claim 1 wherein a pair of parallel tracks are provided on said arm of said machine frame.

3. The machine tool installation in accordance with claim 1 wherein said motion unit drive means comprises a rack on said arm of said machine frame, a pinion on said motion unit engaged with said rack, and a bidirectional motor for driving said pinion.

4. The machine tool installation in accordance with claim 1 wherein frame extensions are provided on both ends of said machine frame, said frame extensions extending over said loading station and parts receiving station, said frame extensions having tracks thereon aligned with, and functioning as a continuation of, the tracks on said arm of said machine frame.

5. The machine tool installation in accordance with claim 1 including a coupling device on each of said loading and unloading unit and extending longitudinally of said frame, said releasable coupling means being provided at the ends of said coupling devices and engageable with cooperating coupling means on said motion unit.

6. The machine tool installation in accordance with claim 1 wherein said motion unit has a track on its lower surface extending perpendicularly to said track on said machine frame arm, and wherein said laser cutting unit is movably mounted on said motion unit track.

7. The machine tool installation in accordance with claim 6 wherein said laser cutting unit is movable on said motion unit track by a rack and pinion drive assembly and a reversible drive motor.

8. The machine tool installation in accordance with claim 1 wherein said motion unit supports a bellows providing an enclosed beam passage chamber which extends along said motion unit to said laser cutting unit.

9. The machine tool installation in accordance with claim 6 wherein laser cutting of the workpiece in the longitudinal direction of the frame (X-axis) is effected by movement of said motion unit on said frame and cutting in the direction perpendicular thereto (Y-axis) is effected by movement of said laser cutting unit along said track on said motion unit.

10. The machine tool installation in accordance with claim 9 wherein said laser cutting unit includes a drive for moving the laser cutting head in the vertical direction.

11. The machine tool installation in accordance with claim 1 wherein said loading unit includes a multiplicity of suction devices actuatable to pick up and transport a sheet workpiece.

12. A machine tool installation for laser cutting of sheet workpieces comprising:
  (a) a workpiece support;
  (b) an elongated machine frame providing an arm extending over said workpiece support;
  (c) a pair of tracks on said arm and extending longitudinally of said frame;
  (d) a motion unit suspended from said track and mounted for movement therealong, said motion unit having a track on its lower surface;
  (e) drive means for moving said motion unit bidirectionally along said tracks, said motion unit drive means comprising a rack on said arm of said machine frame, a pinion on said motion unit engaged with said rack, and a bidirectional motor for driving said pinion;
  (f) a laser cutting unit mounted on said track on the lower surface and said motion unit and extending in an axis perpendicular to said track and including a laser cutting head movable thereon;
  (g) a loading unit at a loading station adjacent one end of said machine frame for lifting and transporting a sheet workpiece above the plane of the upper surface of said workpiece support; said loading unit being moveable on said track;
  (h) an unloading unit at a parts receiving station adjacent the other end of said machine frame for lifting the cut workpieces from said workpiece support and moveable on said track for transporting the cut workpieces to the parts receiving station;
  (i) means on said motion unit for releasably coupling said loading unit and unloading unit thereto for movement therewith along said tracks on said frame; and
  (j) a controller operable to (i) couple and uncouple said loading and unloading units to and from said motion unit, (ii) control movement of said motion unit along said track, (iii) lift, transport and deposit a workpiece on said workpiece support, (iv) effect motion of said laser cutting head relative to a workpiece on said workpiece support to produce cut parts, (v) actuate said unloading unit to remove the cut parts from the workpiece support, and (vi) transport the parts on said unloading unit to the parts receiving station.

13. The machine tool installation in accordance with claim 12 wherein frame extensions are provided on both ends of said machine frame, said frame extensions extending over said loading station and parts receiving station, said frame extensions having tracks thereon aligned with, and functioning as a continuation of, the tracks on said arm of said machine frame.

14. The machine tool installation in accordance with claim 12 including a coupling device on each of said loading and unloading units and extending longitudinally of said frame, said releasable coupling means being provided at the ends of said coupling devices and engageable with cooperating coupling means on said motion unit.

15. The machine tool installation in accordance with claim 12 wherein said laser cutting unit is movable on said motion unit track by a rack and pinion drive assembly and a reversible drive motor.

16. The machine tool installation in accordance with claim 12 wherein laser cutting of the workpiece in the longitudinal direction of the frame (X-axis) is effected by movement of said motion unit on said frame and cutting in the direction perpendicular thereto (Y-axis) is effected by movement of said laser cutting unit along said track on said motion unit.

* * * * *